(12) United States Patent
Hillermeier et al.

(10) Patent No.: US 6,795,840 B1
(45) Date of Patent: Sep. 21, 2004

(54) METHOD FOR GENERATING A SEQUENCE OF RANDOM NUMBERS OF A 1/F-NOISE

(75) Inventors: Claus Hillermeier, Übersee (DE); Georg Denk, Rosenheim (DE); Stefan Schäffler, Augsburg (DE)

(73) Assignee: Infineon Technologies AG, Munich (DE)

( * ) Notice: Subject to any disclaimer, the term of this patent is extended or adjusted under 35 U.S.C. 154(b) by 523 days.

(21) Appl. No.: 09/648,939

(22) Filed: Aug. 28, 2000

(51) Int. Cl.$^7$ ................................................. G06F 1/02
(52) U.S. Cl. ..................................................... 708/250
(58) Field of Search ............................... 708/250, 251, 708/253, 255, 256

(56) References Cited

U.S. PATENT DOCUMENTS

| | | | |
|---|---|---|---|
| 4,255,791 A | | 3/1981 | Martin |
| 5,719,784 A | | 2/1998 | Clark et al. |
| 6,088,676 A | * | 7/2000 | White, Jr. ...................... 705/1 |
| 6,161,075 A | | 12/2000 | Cohen |
| 6,195,634 B1 | * | 2/2001 | Dudemaine et al. ........ 704/231 |

OTHER PUBLICATIONS

Alper Demir: "Analysis and Simulation of Noise in Nonlinear Electronic Circuits and Systems", Dissertation in Engineering–Electrical Engineering and Computer Sciences, University of California, Berkeley, CA, Spring 1997, pp. 1, 2, iii–vii, 88–91.

B. Pellegrini et al.: "1/f Noise Generators", in "Noise in Physical Systems and 1/f Noise", Elsevier Science Publishers B.V., 1986, pp. 425–428.

* cited by examiner

*Primary Examiner*—Chuong Dinh Ngo
(74) *Attorney, Agent, or Firm*—Laurence A. Greenberg; Werner H. Stemer; Gregory L. Mayback (57) ABSTRACT

A computer programmed to process a method for generating a sequence of random numbers of a 1/f noise has the following steps: 1). Determining a constant step $\delta$ or instants of consideration $t_0$ to $t_n$; 2). Determining a desired spectral value $\beta$; 3). Determining the number n of the random numbers, to be generated, of a 1/f noise; 4). Determining an intensity constant const; 5). forming a covariance matrix $\underline{C}$ of dimension (n×n); and 6). Forming the Cholesky decomposition $\underline{L}$ of the covariance matrix $\underline{C}$, with the following steps being carried out for each sequence, to be generated, of random numbers of a 1/f noise: 1). Forming a vector $\underline{x}$ of length n from random numbers normally distributed in [0,1], and 2). Generating a vector $\underline{y}$ of length n of the desired 1/f-distributed random numbers by multiplying the Cholesky-decomposition $\underline{L}$ by the vector $\underline{x}$.

12 Claims, 6 Drawing Sheets

| Determine $\beta$, n, const and $\delta$, and $t_0$ to $t_n$ |
|---|
| Determine covariance matrix $\underline{C}$ |
| Determine Cholesky decomposition $\underline{L}$ of $\underline{C}$ |
| for each desired vector $\underline{y}$ of 1/f-distributed random numbers |
|     Form vector $\underline{x}$ from random numbers which are normally distributed in [0,1] |
|     $\underline{y} = \underline{L} \cdot \underline{x}$ |

FIG. 1

| Determine β, n, const and δ, and $t_0$ to $t_n$ | |
|---|---|
| Determine covariance matrix $\underline{\underline{C}}$ | |
| Determine Cholesky decomposition $\underline{\underline{L}}$ of $\underline{\underline{C}}$ | |
| for each desired vector $\underline{y}$ of 1/f-distributed random numbers | |
| | Form vector $\underline{x}$ from random numbers which are normally distributed in [0,1] |
| | $\underline{y} = \underline{\underline{L}} \cdot \underline{x}$ |

FIG. 2

Covariance matrix $\underline{C}$ (symmetrical)

Cholesky decomposition $\underline{L}$ (triangular matrix)

```
1.41  0.00  0.00  0.00  0.00  0.00
0.58  1.28  0.00  0.00  0.00  0.00
0.38  0.47  1.27  0.00  0.00  0.00
0.03  0.27  0.45  1.27  0.00  0.00
0.26  0.21  0.26  0.44  1.27  0.00
0.23  0.18  0.20  0.25  0.43  1.26
```

FIG. 4 x vector No. 1
-0.35  0.39  -0.90  0.82  0.39  0.19
x vector No. 2
1.72  2.24  -0.26  1.22  -0.19  -1.55
x vector No. 3
0.79  0.46  0.53  -1.87  0.71  0.66

FIG. 5 y vector No. 1
-0.50  0.30  -0.11  0.64  0.62  0.44
y vector No. 2
 2.43  3.89   1.37  2.60  1.17  -0.97
y vector No. 3
 1.11  -0.13  0.76  -2.02  0.32  0.89

FIG. 6

Instants of consideration:

Covariance matrix $\underline{C}$ (symmetrical)

Cholesky decomposition $\underline{\underline{L}}$ (triangular matrix)

```
0.84  0.00  0.00  0.00  0.00  0.00
0.20  0.45  0.00  0.00  0.00  0.00
0.26  0.25  0.75  0.00  0.00  0.00
0.28  0.18  0.35  1.02  0.00  0.00
0.29  0.16  0.25  0.44  1.27  0.00
0.12  0.06  0.09  0.13  0.27  0.76
```

FIG. 9 y vector No. 1
-0.30  0.10  -0.67  0.49  0.60  0.26
y vector No. 2
1.45  1.37  0.83  2.08  1.12  -0.72
y vector No. 3
0.66  -0.05  0.49  -1.58  0.36  0.57

FIG. 10

Covariance matrix $\underline{\underline{C}}$ (symmetrical)

Cholesky decomposition L (triangular matrix)

```
0.84  0.00  0.00  0.00  0.00  0.00
0.20  0.45  0.00  0.00  0.00  0.00
0.26  0.25  0.75  0.00  0.00  0.00
0.28  0.18  0.35  1.02  0.00  0.00
0.00  0.30  0.31  0.48  1.25  0.00
0.00  0.06  0.09  0.15  0.28  0.75
```

FIG. 12 y vector No. 1
-0.30  0.10  -0.67  0.49  0.74  0.24
y vector No. 2
1.45  1.37  0.83  2.08  0.94  -1.08
y vector No. 3
0.66  -0.05  0.49  -1.59  0.01  0.49

FIG. 13

METHOD FOR GENERATING A SEQUENCE OF RANDOM NUMBERS OF A 1/F-NOISE

BACKGROUND OF THE INVENTION

Field of the Invention

The invention relates to a method for generating sequences of random numbers of a 1/f noise.

Random numbers of a 1/f noise can be used, for example, in a transient circuit simulation which takes account of noise, influences. A 1/f noise is understood as a stochastic process with a specific frequency spectrum which can be described by the equation $$S(f) \propto \frac{1}{f^\beta}, \beta \in ]0, 1[$$

1/f noise sources are suitable for modeling noise influences in a multiplicity of technical and physical systems, and for systems for estimating and predicting events on the financial markets. In particular, many electronic components such as, for example, pn diodes and MOS field effect transistors have 1/f noise sources.

It is possible to approximate 1/f noise sources by carrying out a summation of the effects of many noise sources which respectively have a Lorentz spectrum as frequency spectrum. Such noise sources can be modeled, for example, by the system response of a linear time-invariant system which can also be denoted as an LTI system, at whose system input a white noise is applied. It is disadvantageous in this procedure that the dimension of the system of differential equations to be solved numerically is inflated beyond bounds. This results in long computing times and a high storage requirement for a computer system which is used to simulate a system which is subject to the influence of a 1/f noise.

SUMMARY OF THE INVENTION

It is the object of the invention to specify a method for generating a sequence of random numbers of a 1/f noise which can be carried out quickly and with a low computational outlay. It is also the object of the invention to specify an improved method for simulating a technical system which is subject to a 1/f noise. Finally, the aim is also to specify a computer program for determining sequences of random numbers of a 1/f noise which can be carried out quickly and which requires only few resources of a computer system.

This object is achieved by means of the subject matters of the independent patent claims. Improvements follow from the respective subclaims.

In accordance with an idea on which the invention is based, the numerical integration of a system path of a system which is subject to 1/f noise influences is reduced in the case of a constant integration step size to the simulation of sequences of suitably correlated random numbers. A batch method is used in order to generate sequences of such random numbers. In this context, the term "batch method" is understood to mean that the length of the sequence of the random numbers may be arbitrary. However, the random numbers must be prescribed when the method is started, the overall random number sequence being generated in a first computing step. It is possible using the method according to the invention to avoid inflation of the dimension of the system of differential equations to be solved numerically in the case of a constant integration step size. This results in considerable gains in computing time.

In accordance with a further idea on which the invention is based, the efficiency of the numerical determination of the dynamics of the simulated system is substantially raised by adaptive step size control. Specifically, the invention specifies a method which permits an adaptive step size control and a numerical simulation of 1/f noise sources to be combined with one another, it being possible for the simulation of 1/f noise to be incorporated into a transient system simulation with adaptively controlled step size. The invention permits the known methods for adaptive step size control to be combined with a numerical simulation of 1/f noise sources without the system dimension being inflated. The procedure for this purpose is a two-stage method. In a first stage, the system dynamics are integrated numerically using an adaptive step size control, the 1/f noise sources not yet being taken into account. The adaptive step sizes determined in the process serve as the basis of a second integration pass in which account is taken of the 1/f noise sources whose proportions are determined with the aid of the information obtained in the first stage of the simulation. Thus, in the case of the transient simulation of a system the invention renders it possible to use the advantages of adaptive step size control together with a simplified numerical simulation of 1/f noise sources. This produces an increased numerical approximation quality of the simulation in conjunction with efficient use of the available computing time resources, inflation of the system dimension being avoided.

In accordance with the invention, the problem of noise simulation in modeling the system to be simulated is converted into the problem of generating a random number sequence. In accordance with the invention, the correlations of these random numbers are determined, and this is used for simple and accurate generation of the corresponding random number sequences.

The methods according to the invention for generating a sequence of random numbers of a 1/f noise provide as steps, in particular, the formation of a covariance matrix $\underline{\underline{C}}$ from which the Cholesky decomposition $\underline{\underline{L}}$ is subsequently formed. The covariance matrix $\underline{\underline{C}}$ differs in this process in the case in which a constant simulation step size $\delta$ is used from the case in which an adaptive step size is used.

For the case of a constant step size $\delta$, the covariance matrix is determined element by element with knowledge of a desired spectral value $\beta$, the number n of the random numbers, to be generated, of a 1/f noise and the intensity constant const, one element e(i,j) each of the covariance matrix C being determined using the following equation:

$$e(i,j) = \text{const.} |\delta|^{\beta+1} \cdot (|i-j+1|^{\beta+1} - 2|i-j|^{\beta+1} + |i-j-1|^{\beta+1})$$

where i,j=1, ..., n.

The Cholesky decomposition $\underline{\underline{L}}$ of the covariance matrix $\underline{\underline{C}}$ is subsequently formed, $\underline{\underline{C}} = \underline{\underline{L}} \cdot \underline{\underline{L}}^T$, $\underline{\underline{L}}$ assuming the form of a triangular matrix in which only the diagonals and the lower half are occupied.

The Cholesky decomposition $\underline{\underline{L}}$ thus found can now be used to generate arbitrarily many sequences of random numbers of a 1/f noise. A vector $\underline{x}$ of length n is firstly formed for this purpose from random numbers normally distributed in [0,1]. Such normally distributed random numbers have an expected value 0 and a variance 1. They can be determined in a known way by transformation from a vector, of equal length, of equally distributed random numbers.

The target vector $\underline{y}$ with the desired 1/f-distributed random numbers is then produced by multiplying the Cholesky decomposition $\overline{\overline{L}}$ by the vector $\underline{x}$.

In the method according to the invention, which permits an adaptive numerical solution of stochastic differential equations, the procedure is essentially as described above. However, by contrast with the mode of procedure described above it is not possible to assume a constant simulation step size $\delta$. Rather, it is necessary firstly to calculate a step size vector $\underline{\delta}$ which results from prescribed instants of consideration $t_0-t_n$ in the first step of the simulation. Thereafter, the covariance matrix $\overline{\overline{C}}$ is set up by determining the elements thereof using the following equation:

$$e(i,j) = \text{const} \cdot (-|t_j-t_i|^{\beta+1}+|t_{j-1}-t_i|^{\beta+1}+|t_j-t_{i-1}|^{\beta+1}-|t_{j-1}-t_{i-1}|^{\beta+1})$$

where $i,j=1, \ldots, n$.

The concept of simulating 1/f noise is based on the following thinking. The dynamics of a system which is subject to stochastic influences is modeled adequately by a stochastic process. Individual random realizations (so-called paths) of the basic stochastic process are generally calculated numerically for the purpose of simulating such system dynamics. Paths of stochastic integrals of the form $$\int_0^t Y(s) \eta_{\frac{1}{f}}(s) ds$$

are calculated numerically in order to simulate systems with 1/f noise sources. Here, s (integration variable) and t (upper integration limit) denote the time, $$\eta_{\frac{1}{f}}$$

(s)ds denotes a 1/f noise source, and Y(s) denotes a stochastic process which describes the time dynamics of a variable, for example the electric voltage in the circuit simulation.

If $B_{FBM}(s)$ denotes that stochastic process whose derivation (mathematically: derivation in the distribution sense) yields the 1/f noise process $$\eta_{\frac{1}{f}}$$

(s), the stochastic integral to be calculated can be written as $$\int_0^t Y(s) \eta_{\frac{1}{f}}(s) ds = \int_0^t Y(s) dB_{FBM}(s) \quad (1.1)$$

The integral of the right-hand side is to be interpreted as Riemann Stieltjes integral of the stochastic process Y(s) with the process $B_{FBM}(s)$ as integrator. This integral can be approximated by a sum by decomposing the integration interval [0,t] in accordance with $0=t_0<t_1<\ldots<t=t$ into n disjoint subintervals $[t_i, t_{i-1}]$, $i=1, \ldots$ n:

$$\int_0^t Y(s) dB_{FBM}(s) \approx \sum_{i=1}^n Y(t_{i-1})[B_{FBM}(t_i) - B_{FBM}(t_{i-1})] \quad (1.2)$$

This sum is a random variable. The dependence on the result $\omega$ of the random experiment was consistently omitted.

A process $B_{FBM}(s)$ whose generalized derivation has a 1/f spectrum is known in the literature under the name of "fractional Brownian motion". $B_{FBM}(s)$ is a Gaussian stochastic process, and as such is characterized completely by its expected value $$E(B_{FBM}(s)) = 0 \, \forall s \in R \quad (1.3)$$

and by its covariance function $$\text{Cov}(B_{FBM}(s), B_{FBM}(t)) = \text{const} \cdot (|s|^{\beta+1}+|t|^{\beta+1}-|t-s|^{\beta+1}) \quad (1.4)$$

The batch method according to the invention for generating suitable random numbers reduces the simulation of 1/f noise influences essentially to the generation of realizations of the random variables $[B_{FBM}(t_i)-B_{FBM}(t_{i-1})]$, that is to say of increases in the fractional Brownian motion.

For the purpose of the numerical solution of stochastic differential equations with $$\frac{1}{f^\beta}$$

noise sources, the step size of the numerical integration may constantly be set to the value $\delta>0$, and a number $n \in N$ which stipulates the number of the time steps over which numerical integration is to performed may be (arbitrarily) selected.

For this constant step size and this fixed integration interval, the aim now is to generate the required correlated random numbers all at once, that is to say in the course of a batch method.

In order to calculate a path of the integral $\int_0^T Y(s) dB_{FBM}(s)$ approximately, there is a need in each case, in accordance with the above, to realize the random variables $\Delta B_{FBM}(i) := [B_{FBM}(i\delta)-B_{FBM}((i-1)\delta)]$, $i=1, \ldots, n$. The formulae (1.3) and (1.4) can be used to calculate the expected value, variance and covariance of these intercorrelated random variables:

$$E(\Delta B_{FBM}(i)) = 0, i=1, \ldots, n \quad (2.5)$$

$$\text{Var}(\Delta B_{FBM}(i)) = 2 \cdot \text{const} \cdot |\delta|^{\beta+1}, i=1, \ldots, n \quad (2.6)$$

$$\text{Cov}(\Delta B_{FBM}(i), \Delta B_{FBM}(j)) = \text{const} \cdot |\delta|^{\beta+1} \cdot (|i-j+1|^{\beta+1}-2|i-j|^{\beta+1}+|i-j-1|^{\beta+1}), i,j=1,\ldots,n \quad (2.7)$$

Since the random variables $\Delta B_{FBM}(i)$ represent increases in a Gaussian stochastic process, the random variable vector $(\Delta B_{FBM}(1), \ldots, \Delta B_{FBM}(n))$ is an n-dimensional Gaussian-distributed random variable, and is therefore completely determined by expected value, variance and covariance (in accordance with formulas (2.5) to (2.7)).

A batch method for respectively generating a realization of the correlated random variables $\Delta B_{FBM}(1), \ldots, \Delta B_{FBM}(n)$ is therefore as follows:

select a value of the coefficient const>0 which parametrizes the intensity of the 1/f noise source generate a realization of an n-dimensional Gaussian normal distribution with the expected value 0 and covariance matrix $$\text{Cov}_{ij} = \text{const} \cdot |\delta|^{\beta+1} \cdot (|i-j+1|^{\beta+1}-2|i-j|^{\beta+1}|i-j-1|^{\beta+1}), i,j=1, \ldots, (2.8)$$

interpret the random number vector thus generated as a realization of the sequence of $B_{FBM}$ increases $\{\Delta B_{FBM}(1), \ldots, \Delta B_{FBM}(n)\}$, and use this realization in accordance with section 1 for the numerical calculation of a stochastic path of time length $n \cdot \delta$.

It may be pointed out that a dedicated realization of the sequence $\{\Delta B_{FBM}(1), \ldots, \Delta B_{FBM}(n)\}$ must be calculated for each 1/f noise source in the system.

The following procedure is adopted in the case of the batch methods for the numerical solution of stochastic differential equations with $$\frac{1}{f^\beta}$$

noise sources in the case of an adaptive step size.

Firstly, an adaptive step size determination is carried out. The quality of the approximation (1.2) depends essentially on the decomposition of the integration interval [0,t] into disjoint subintervals $[t_i, t_{i-1}]$, i=1, ..., n. In the numerical solution of deterministic differential equations, there are methods for step size control which adapt the step size—that is to say, the length of the currently processed subinterval—to the respective current time scale of the system dynamics, and thereby ensure that the available computing time is used as specifically as possible to increase the numerical approximation accuracy. A possible step size control is specified as follows:

Prescribe a tolerable local discretization error $e_{max} > 0$.

Estimate the current local error $e_{lok}$ (that is to say, the error contribution made to the approximation error which is generated in the current integration substep). This estimate can be performed in one of the following ways:

a) Repeat the last iteration step with half the step size, and form the difference between the two results.

b) Compare the result of the current method rule with the result of a method rule of higher error order ("embedding"), for example by means of a Runge-Kutta method.

c) Direct approximation using a numerical difference quotient, for example, with the aid of polynomial interpolation.

If the estimated local error $e_{lok}$ is greater than $e_{max}$, the current step is abandoned, otherwise accepted (a posteriori estimator).

The step size of the next step is determined by comparing $e_{lok}$ with $e_{max}$. If $e_{lok} < e_{max}$, the step size is increased, otherwise reduced (a priori estimator). The estimation method for the local error $e_{lok}$ can be selected variously for a priori and a posteriori estimators.

The present invention describes a method which renders it possible for the improvement in the approximation accuracy by means of step size control also to be used for the simulation of 1/f noise.

For this purpose, the numerical integration is carried out in 2 stages.

(A) In stage (A), the desired integration time t>0 is prescribed, and the system dynamics are calculated neglecting the 1/f noise sources. This is performed by numerical solution of the system of ordinary (or algebroid) differential equations which describes the deterministic component of the system dynamics. During this stage A integration, use is made of a method for step size adaptation, for example, that described above. After the traversal of the stage A integration, the result of the step size adaptation is a sequence of accepted step sizes, and thus a subdivision of the integration interval [0, t] into disjoint subintervals $[t_i, t_{i-1}]$, i=1, ..., n. The number n of required subintervals is likewise a result of the step size control.

(B) The stage A integration is followed by a second numerical integration run which extends over the same integration interval [0, t]. The 1/f noise sources are now also incorporated into the simulation of the system dynamics. Use is made as sole result of the integration run (A) of the discretization of the integration interval [0, t] into disjoint subintervals $[t_i, t_{i-1}]$, i=1, ..., n, and the number n of required subintervals. The simulation of the system dynamics follows the concept presented above. In this case, the required realizations of the random variables $[B_{FBM}(t_i)-B_{FBM}(t_{i-1})]$ are generated using a method which is presented below.

Let there be given a subdivision of the integration interval [0,t] into n subintervals $[t_i, t_{i-1}]$, i=1, ..., n, $t_0 < t_i < ... < t \equiv t$.

As described above, calculating a path of the integral $\int_0^T Y(s) dB_{FBM}(s)$ approximately requires a realization of the random variables $\Delta B_{FBM}(i):=[B_{FBM}(t_i)-B_{FBM}(t_{i-1})]$, i=1, ... n in each case. The expected value, variance and covariance of these intercorrelated random numbers can be calculated from the formulas (1.3) and (1.4):

$$E(\Delta B_{FBM}(i))=0, i=1, \ldots, n \qquad (3.5)$$

$$\text{Var}(\Delta B_{FBM}(i))=2 \cdot \text{const}|t_i-t_{i-1}|^{\beta+1}, i=1. \ldots, n \qquad (3.6)$$

$$\text{Cov}(\Delta B_{FBM}(i), \Delta B_{FBM}(j))=\text{const} \cdot |t_j-t_i|^{\beta+1}+|t_{j-1}-t_i|^{\beta+1}+|t_j-t_{i-1}|^{\beta+1}-|t_{j-1}-t_{i-1}|^{\beta+1}), i,j=1, \ldots, n \qquad (3.7)$$

Since the random variables $\Delta B_{FBM}(i)$ represent increases in a Gaussian stochastic process, the random variable vector $(\Delta B_{FBM}(1), \ldots, \Delta B_{FBM}(n))$ is an n-dimensional Gaussian-distributed random variable, and thus completely determined by the expected value, variance and covariance (in accordance with formulas (3.5) to (3.7)).

A batch method for respectively generating a realization of the correlated random variables $\Delta B_{FBM}(1), \ldots, \Delta B_{FBM}(n)$ is therefore as follows:

select a value of the coefficient const>0 which parametrizes the intensity of the 1/f noise source generate a realization of an n-dimensional Gaussian normal distribution with the expected value 0 and covariance matrix $$\text{Cov}_{ij}=\text{const} \cdot (-|t_j-t_i|^{\beta+1}+|t_{j-1}-t_i|^{\beta+1}+|t_j-t_{i-1}|^{\beta+1}-|t_{j-1}-t_{i-1}|^{\beta+1}) \qquad (3.8)$$

i,j=, ... n.

interpret the random number vector thus generated as a realization of the sequence of $B_{FBM}$ increases $\{\Delta B_{FBM}(1), \ldots, \Delta B_{FBM}(n)\}$, and use this realization as set forth above for the numerical calculation of a stochastic path for the time interval [0, t].

It may be pointed out that a dedicated realization of the sequence $\{\Delta B_{FBM}(1), \ldots, \Delta B_{FBM}(n)\}$ must be calculated for each 1/f noise source in the system.

If all elements of the covariance matrix $\overline{\overline{C}}$ are determined, the non-calculated elements being occupied by the value 0, the result is an even rapid calculation. However, it is then necessary to accept limitations as regards the accuracy of the random numbers generated.

The invention is also implemented in a method for simulating a technical system which is subject to a 1/f noise, use being made when modeling and/or stipulating the variables present on input channels of the system of random numbers which have been determined using a method according to the invention.

A computer program is likewise provided for determining sequences of random numbers of a 1/f noise, and is designed such that the method according to the invention can be carried out. The invention is also implemented in a data medium having such a computer program. Furthermore, the invention is implemented in a method in the case of which a computer program according to the invention is downloaded from an electronic data network such as, for example, from the Internet onto a computer connected to the data network.

The invention is explained in the drawing with the aid of several exemplary embodiments.

DESCRIPTION OF THE PREFERRED EMBODIMENT

Figure 1:
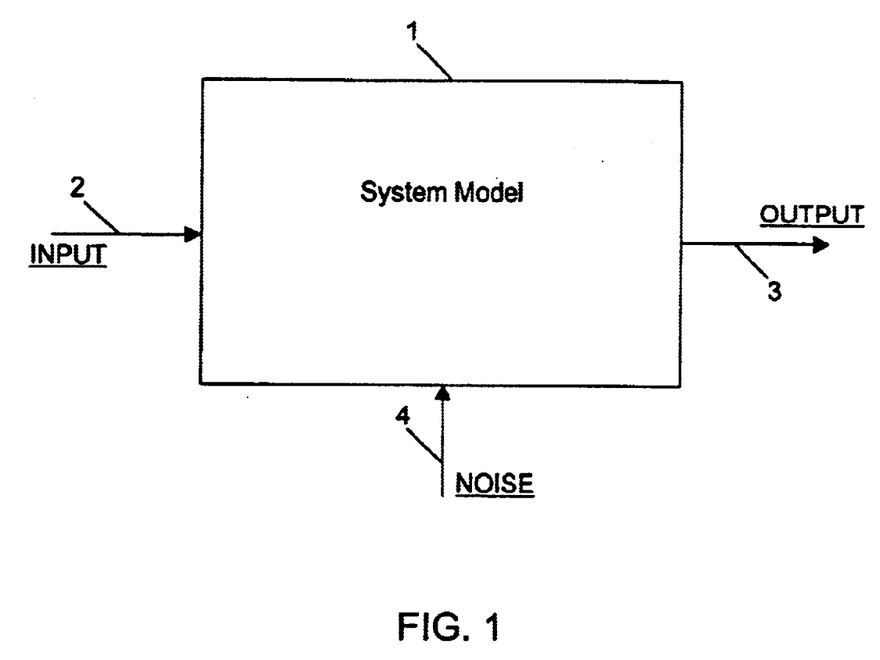
FIG. 1 shows a schematic illustration of a technical system to be simulated.

FIG. 1 shows a schematic illustration of a noisy system which is to be simulated. The system is described by a system model 1 which is indicated as a box and describes the system performance. The system performance is yielded by the input channels 2, which are also denoted as the vector INPUT, and by the output channels 3, which are also denoted as OUTPUT. Also provided is a system-induced noise which is present on noise input channels 4 and is also denoted as the vector NOISE. The noise on the noise input channels 4 is preferably interpreted as a noise-induced variation in the system model 1.

The performance of the input channels 2 and the output channels 3 can be described by a system of differential equations or by a system of algebroid differential equations, such that reliable predictions of the system performance are possible.

At every time step of the simulation of the system shown in FIG. 1, a vector OUTPUT of the output channels 3 is calculated for a vector INPUT present on the input channels 2 and for a vector NOISE present on the noise input channels 4. It is sensible to specify the vectors INPUT, OUTPUT, NOISE as matrices for the purpose of simulation over a longer time period, one column each of the relevant matrix containing the values of the corresponding time series of the relevant INPUT, OUTPUT, NOISE.

Figure 2:
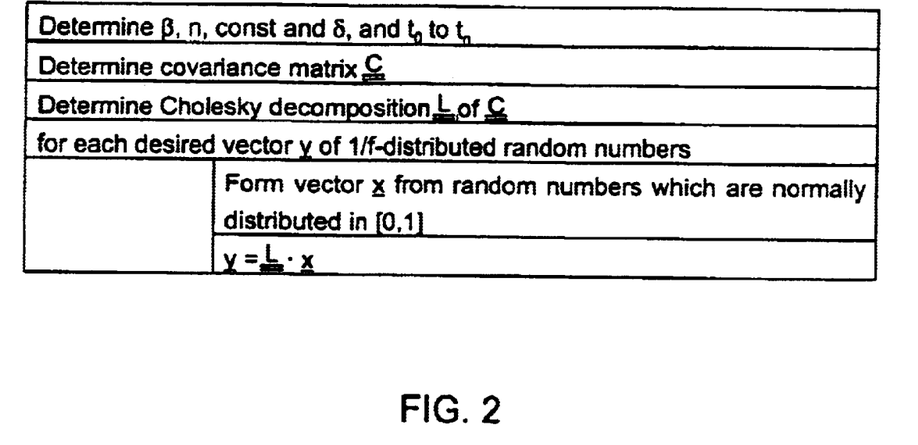
FIG. 2 shows a structogram for determining sequences of random numbers of a 1/f noise.

FIG. 2 illustrates how to arrive in each case at a vector y which forms a column of the matrix for the noise input channels 4 of the system model 1.

It is firstly distinguished in a first step whether a simulation method with a constant step size δ or a method with an adaptive step size in accordance with the instants of consideration $t_0$ to $t_n$ is to be carried out. It is also necessary to stipulate a desired spectral value â, the number n of the random numbers of the 1/f noise which are to be generated, and the intensity constant const.

In the next step of FIG. 2, the covariance matrix $\overline{\overline{C}}$ is determined, specifically in accordance with the equations, specified in the introduction of the description, for a constant step size or for an adaptive step size. The Cholesky decomposition $\overline{\overline{L}}$ of the covariance matrix $\overline{\overline{C}}$ is determined in the next step.

Finally, the individual columns of the matrix NOISE present on the noise input channels 4 are determined. Every column corresponds to a vector $\underline{y}$ with a total of n 1/f-distributed random numbers. Firstly, a vector $\underline{x}$ of n random numbers is generated, said numbers being normally distributed in [0,1]. These random numbers have the expected value 0 and the variance 1. Thereafter, the vector $\underline{x}$ is multiplied by the Cholesky decomposition L. Thereafter, the calculation of the next desired vector $\underline{y}$ of 1/f-distributed random numbers is continued and forms the next column of the matrix NOISE.

FIGS. 3 to 13 reproduce exemplary embodiments which express the results of calculation. In each exemplary embodiment, the same N(0,1) vectors or x vectors are used respectively. All values were truncated after the second decimal point after exact calculation, in order to be able to reproduce them more effectively.

Consequently, when realizing the exemplary embodiments computationally calculation need be continued not with the intermediate values shown, but with the exact intermediate values, in order to arrive at the specified y vectors starting from the specified $\underline{x}$ vectors.

The value β was assumed to be 0.5. The value const was taken to be 1.0. δ was always set to 1 in the case of a constant step size.

Figure 3:
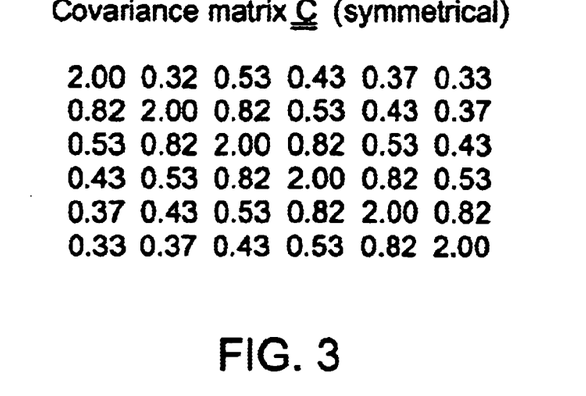
FIG. 3 shows a covariance matrix $\overline{\overline{C}}$ of dimension (6×6), for generating a vector $\underline{y}$ of length $\overline{6}$ from 1/f-distributed random numbers in the case of a constant simulation step size δ.

FIG. 3 shows a covariance matrix $\overline{\overline{C}}$ of dimension (6×6) for generating a vector $\underline{y}$ of length 6 of 1/f-distributed random numbers in the case of a constant simulation step size δ.

The convariance matrix $\overline{\overline{C}}$ was calculated using the formula $$e(i,j) = \text{const} \cdot |\delta|^{\beta+1} \cdot (|i-j+1|^{\beta+1} - 2|i-j|^{\beta+1} + |i-j-1|^{\beta+1})$$

The dimension (6×6) is yielded by the length of the desired $\underline{y}$ vectors n=6.

The calculation of the element e(1,1)=2 from $\overline{\overline{C}}$ is carried out by way of example. For this purpose, i=j=1.

$$e(1,1) = 1.0 \cdot |1|^{1+0.5} \cdot (|1-1+1|^{0.5+1} - 2|1-1|^{0.5+1} + |1-1-1|^{0.5+1}) =$$
$$= 1 - 0 + 1 = 2;$$

Figure 4:
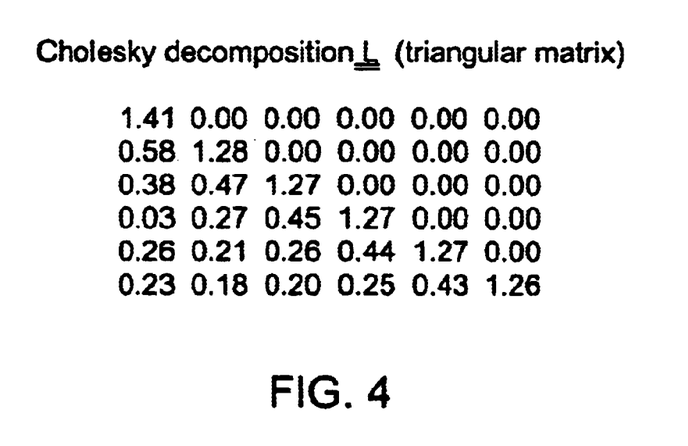
FIG. 4 shows the Cholesky decomposition $\overline{\overline{L}}$ of the covariance matrix $\overline{\overline{C}}$ in FIG. 3.

FIG. 4 shows the Cholesky decomposition L of the covariance matrix $\overline{\overline{C}}$ in FIG. 3. The condition $\overline{\overline{C}} = \overline{\overline{L}} \cdot \overline{\overline{L}}^T$ holds. This can be verified by multiplying out the element (1,1)= $2^{0.5}$ of $\overline{\overline{L}}$ using the element (1,1)=2 of $\overline{\overline{C}}$, because $(2^{0.5} \cdot 2^{0.5})$= 2.

Figure 5:
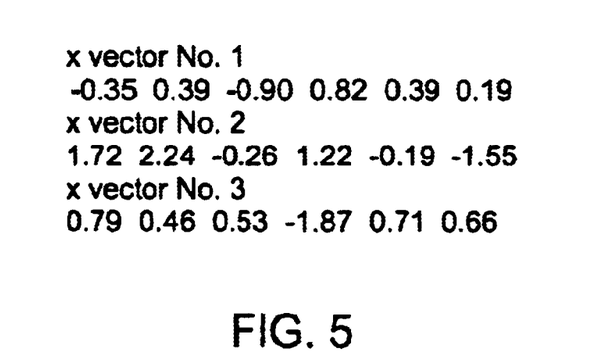
FIG. 5 shows three vectors $\underline{x}$ of length 6 from random numbers normally distributed in [0,1]

FIG. 5 shows three vectors x of length 6 from random numbers normally distributed in [0,1]. The person skilled in the art of statistics knows how to arrive at such random numbers with the expected value 0 and the variance 1.

Figure 6:
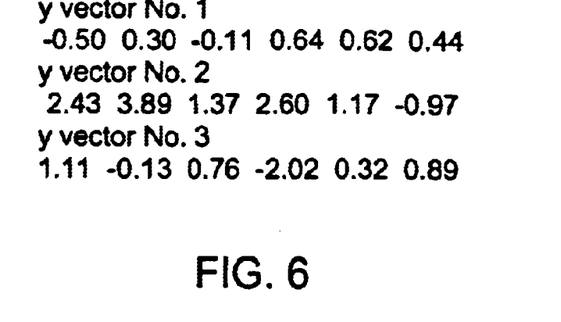
FIG. 6 shows three vectors $\underline{y}$ of length 6 with 1/f-distributed random numbers in the case of a constant step size.

FIG. 6 shows three vectors y of length 6 with 1/f-distributed random numbers in the case of a constant step size. The vectors y are yielded by multiplying the vectors x in accordance with FIG. 5 by the Cholesky decomposition L in accordance with FIG. 4.

Figure 7:
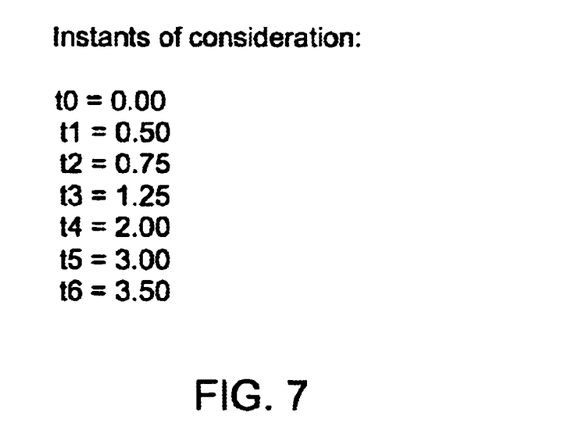
FIG. 7 shows instants of consideration $t_0$ to $t_6$.

FIG. 7 shows instants of consideration $t_0$ to $t_6$ as desired in accordance with an adaptive generation of 1/f-distributed random numbers in a further exemplary embodiment. The instants of consideration $t_0$ to $t_6$ are yielded by a first simulation step (not illustrated here in more detail).

Figure 8:
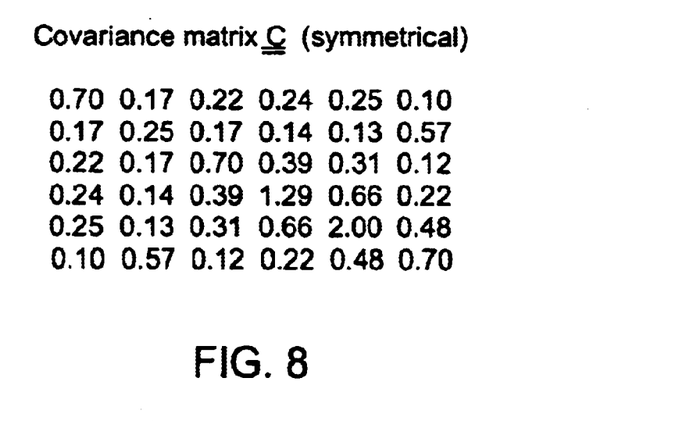
FIG. 8 shows a covariance matrix $\overline{\overline{C}}$ of dimension (6×6), which has been calculated from the instants of consideration in FIG. 7.

FIG. 8 shows a covariance matrix C of dimension (6×6), which has been calculated from the instants of consideration in FIG. 7.

The covariance matrix C was calculated using the formula $$e(i,j) = \text{const} \cdot (-|t_j - t_i|^{\beta+1} + |t_{j-1} - t_i|^{\beta+1} + |t_j - t_{i-1}|^{\beta+1} - |t_{j-1} - t_{i-1}|^{\beta+1})$$

The dimension (6×6) is yielded by the length of the desired y vectors n=6.

The calculation of the element e(1,1)=0.70 from C is carried out by way of example. For this purpose, i=j=1, $t_0=0.00$, $t_1=0.50$.

$$e(1,1) = 1 \cdot (-|t_1 - t_1|^{0.5+1} + |t_0 - t_1|^{0.5+1} + |t_1 - t_0|^{0.5+1} - |t_0 - t_0|^{0.5+1}) =$$
$$= 0.5^{1.5} + 0.5^{1.5} = 0.707106781$$

Figure 9:
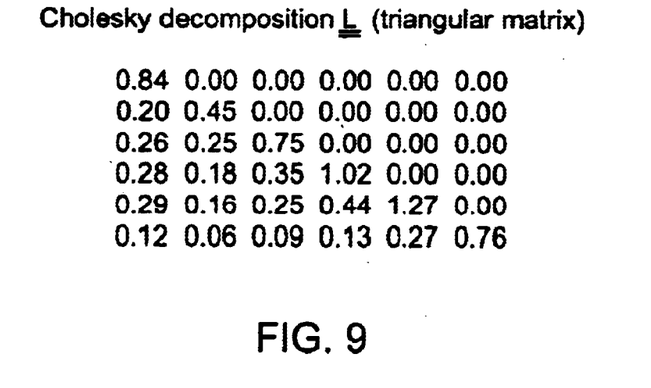
FIG. 9 shows the Cholesky decomposition $\overline{\overline{L}}$ of the covariance matrix $\overline{\overline{C}}$ in FIG. 9.

FIG. 9 shows the Cholesky decomposition L of the covariance matrix C in FIG. 8. The condition $C = L \cdot L^T$ holds. This can be verified by multiplying out the element (1,1)= 0.84 ... of L using the element (1,1)=0.70 ... of C, because (0.84 ... 0.84 ...)=0.70. ...

Figure 10:
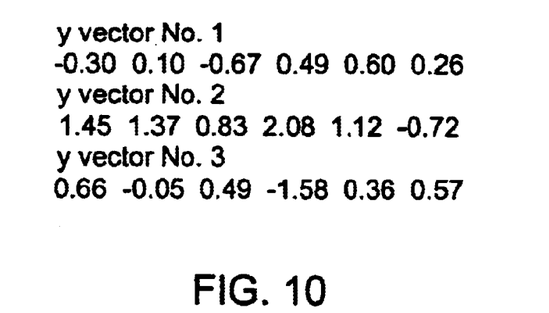
FIG. 10 shows three vectors v of length 6 with 1/f-distributed random numbers in the case of an adaptive step size relative to instants of consideration according to FIG. 7.

FIG. 10 shows three vectors y of length 6 with 1/f-distributed random numbers in the case of an adaptive step size relative to instants of consideration according to FIG. 7. The vectors y are yielded by multiplying the vectors x in accordance with FIG. 5 by the Cholesky decomposition L in accordance with FIG. 9.

Figure 11:
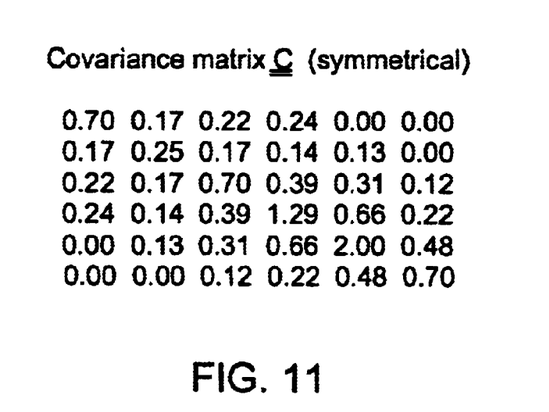
FIG. 11 shows a covariance matrix $\overline{\overline{C}}$ of a further exemplary embodiment of a simulation with an adaptive step size.

FIG. 11 shows a covariance matrix C of a further exemplary embodiment of a simulation with an adaptive step size relative to instants of consideration according to FIG. 7. The covariance matrix C according to FIG. 11 essentially corresponds to the covariance matrix C according to FIG. 8. The calculation of the covariance matrix C in FIG. 11 is, however, substantially simplified, because the elements e(1, 5), e(1,6), e(2,6) and e(5,1), e(6,1), e(6,2) have been set simply to "0". These therefore do not need to be calculated. This can be interpreted in such a way that the statistical relationship between 1/f random numbers situated further away is neglected. In some simulations, this also produces a useful result.

Figure 12:
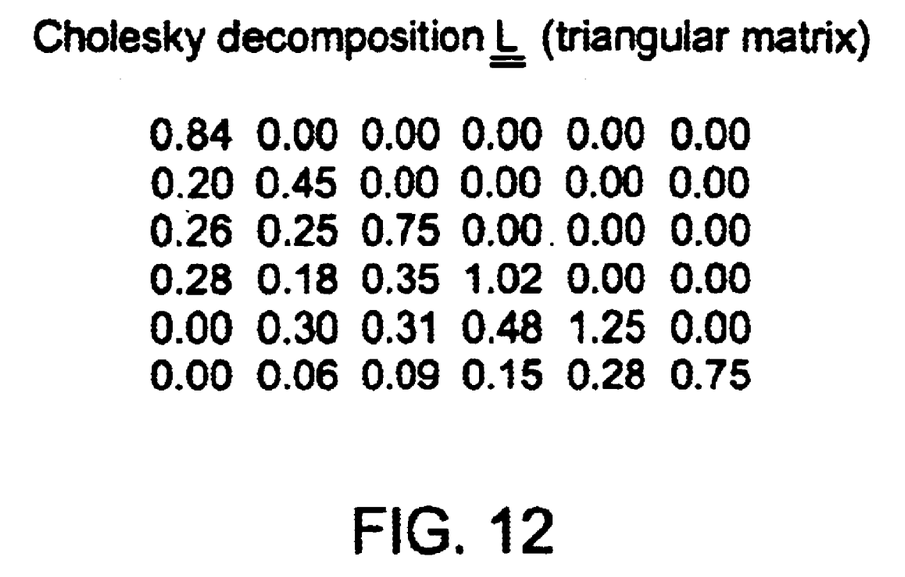
FIG. 12 shows the Cholesky decomposition $\overline{\overline{L}}$ of the covariance matrix $\overline{\overline{C}}$ in FIG. 13.
Figure 13:
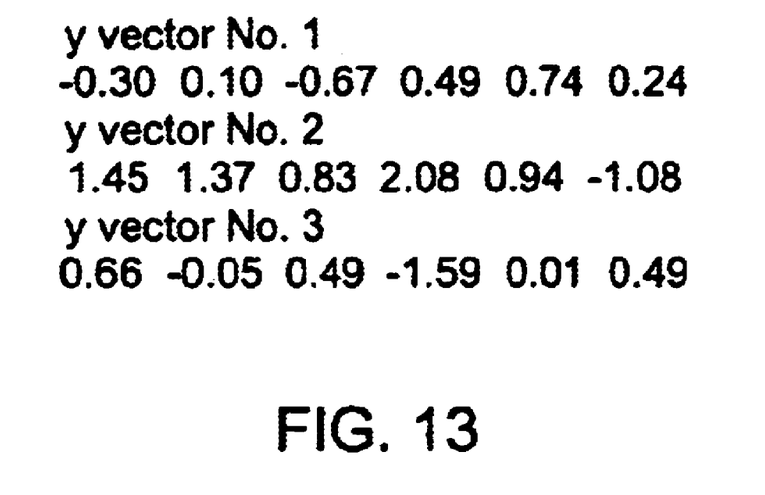
FIG. 13 shows three vectors $\underline{y}$ of length 6 with approximately 1/f-distributed random numbers relative to instants of consideration according to FIG. 7.

FIG. 12 shows the Cholesky decomposition L of the covariance matrix C in FIG. 13.

FIG. 13 shows three vectors y of length 6 with falsely approximated 1/f-distributed random numbers at instants according to FIG. 7.

We claim:

1. A computer programmed to process a method of determining sequences of random numbers of a 1/f noise comprising the following steps: determining a constant step width ∂;

determining a desired spectral value β;

determining a number n of random numbers, to be generated, of the 1/f noise;

determining an intensity constant const;

forming a covariance matrix C of dimension (n×n), defining one element e(i,j) each of the covariance matrix C with the following equation:

$$e(i,j) = \text{const} \cdot |\delta|^{\beta+1} \cdot (|i-j+1|^{\beta+1} - 2|i-j|^{\beta+1} + |i-j-1|^{\beta+1})$$

where i,j=1, . . . , n;

forming a Cholesky-decomposition L of the covariance matrix C;

defining a vector x of length n from random numbers normally distributed in [0,1]; and generating a vector y of length n of the desired 1/f-distributed random numbers by multiplying the Cholesky-decomposition L by the vector x.

2. A computer-readable medium having computer-executable instructions for programming the computer according to claim 1.

3. A programming method, which comprises downloading data containing computer-executable instructions for programming the computer according to claim 1 from a data network onto a computer connected to the data network.

4. The programming method according to claim 3, wherein the data network is the Internet.

5. A computer programmed to process a method of determining sequences of random numbers of a 1/f noise, comprising the following steps:

determining a number n of random numbers, to be generated, of a 1/f-noise;

determining instants of consideration $t_0$ to $t_n$ of the random numbers when determining the sequence of random numbers of the 1/f noise;

determining an intensity constant const;

determining a desired spectral value β; forming a covariance matrix C of dimension (n×n), and thereby defining one element e(i,j) each of the covariance matrix C with the following equation:

$$e(i,j) = \text{const} \cdot (-|t_j - t_i|^{\beta+1} + |t_{j-1} - t_i|^{\beta+1} t_y - t_{i-j}|^{\beta+1} - t_{j-1} - t_{i-1}|^{\beta+1})$$

where i,j=1, . . . , n;

forming a Cholesky-decomposition L of the covariance matrix C defining a vector x of length n from random numbers normally distributed in [0,1]; and generating a vector y of length n of the desired 1/f-distributed random numbers by multiplying the Cholesky-decomposition L by the vector x.

6. A computer-readable medium having computer-executable instructions for programming the computer according to claim 5.

7. A programming method, which comprises downloading data containing computer-executable instructions for programming the computer according to claim 5 from a data network onto a computer connected to the data network.

8. The programming method according to claim 7, wherein the data network is the Internet.

9. A computer programmed to process a method of determining sequences of random numbers of a 1/f noise, comprising the following steps:

determining a number n of random numbers, to be generated, of a 1/f noise;

determining instants of consideration $t_0$ to $t_n$ of the random numbers when determining the sequence of the random numbers of the 1/f noise;

determining a vector ∂ for a step width of a length n from the instants of consideration $t_0$ to $t_n$, where each element $\partial_i$ of the vector ∂ for the step width is calculated with the following equation:

$$\partial_i = t_i - t_{i-1};$$

determining an intensity constant const;

determining a desired spectral value β, forming a covariance matrix $\underline{\underline{C}}$ of dimension (n×n), and thereby defining an element e(i,j) in each of the covariance matrix $\underline{\underline{C}}$ with the following equation:

$$e(i,j) = \text{const} \cdot (-|\delta_j - \delta_i|^{\beta+1} + |\delta_{j-1} - \delta_i|^{\beta+1} + |\delta_j - \delta_{i-1}|^{\beta+1} - |\delta_{j-1} - \delta_{i-1}|^{\beta+1})$$

where i,j = 1, . . . , n;

forming a Cholesky-decomposition $\underline{\underline{L}}$ of the covariance matrix $\underline{\underline{C}}$ defining a vector $\underline{x}$ of length n from the random numbers normally distributed in [0,1]; and generating a vector $\underline{y}$ of length n of the desired 1/f-distributed random numbers by multiplying the Cholesky-decomposition $\underline{\underline{L}}$ by the vector x.

10. A computer-readable medium having computer-executable instructions for programming the computer according to claim 9.

11. A programming method, which comprises downloading data containing computer-executable instructions for programming the computer according to claim 9 from a data network onto a computer connected to the data network.

12. The programming method according to claim 11, wherein the data network is the Internet.

* * * * *

UNITED STATES PATENT AND TRADEMARK OFFICE
CERTIFICATE OF CORRECTION

PATENT NO. : 6,795,840 B1
DATED : September 21, 2004
INVENTOR(S) : Claus Hillermeier et al.

It is certified that error appears in the above-identified patent and that said Letters Patent is hereby corrected as shown below:

Column 3,
Line 34, should read as follows:
-- $\int_{\bar{t}} \eta_1(s)\,ds$ --

Line 36, should read as follows:
-- denotes a 1/f noise source, and Y(s) denotes a stochas --

Line 44, should read as follows:
-- $\int_{\bar{t}} \eta_1(s)\,ds$ --

Line 46, should read as follows:
-- the stochastic integral to be calculated can be written as --

Column 4,
Line 58, should read as follows:
-- $Cov_{ij} = const \cdot \delta|^{\beta+1} (|i\text{-}j+1|^{\beta+1} - 2|i\text{-}j|^{\beta+1} + [i\text{-}j\text{-}1]^{\beta+1})$, $i,j=1,\ldots,n$. (2.8) --

Column 6,
Line 8, should read as follows:
-- [0,t] into n subintervals $[t_i, t_{i\text{-}1}]$, $i=1, \ldots n$, $0 \equiv t_0 < t_1 < \ldots < t \equiv t$. --

Lines 19 and 20, should read as follows:
-- $Cov(\Delta B_{FBM}(i), \Delta B_{FBM}(j)) = const \cdot |t_j\text{-}t_i|^{\beta+1} + |t_{j\text{-}1}\text{-}t_i|^{\beta+1} |t_j\text{-}t_{i\text{-}1}|^{\beta+1} - |t_{j\text{-}1}\text{-}t_{i\text{-}1}|^{\beta+1})$, --
$i,j=1, \ldots, n$ (3.7)

UNITED STATES PATENT AND TRADEMARK OFFICE
CERTIFICATE OF CORRECTION

PATENT NO. : 6,795,840 B1
DATED : September 21, 2004
INVENTOR(S) : Claus Hillermeier et al.

It is certified that error appears in the above-identified patent and that said Letters Patent is hereby corrected as shown below:

<u>Column 10,</u>
Line 43, should read as follows:
-- $e(i,j) = \text{const} \cdot (-|t_j - t_i|^{\beta+1} + |t_{j-1} - t|^{\beta+1} + |t_j - t_{i-1}|^{\beta+1} - |t_{j-1} - t_{i-1}|^{\beta+1})$ --

<u>Column 11,</u>
Line 4, should read as follows:
-- determining a vector $\partial$ for a step width of a length *n* from --

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,795,840 B1
DATED : September 21, 2004
INVENTOR(S) : Claus Hillermeier et al.

It is certified that error appears in the above-identified patent and that said Letters Patent is hereby corrected as shown below:

Column 3,
Line 44, should read as follows: $\dfrac{\eta_1(s)}{f}$

Signed and Sealed this

Tenth Day of May, 2005

JON W. DUDAS
*Director of the United States Patent and Trademark Office*